May 22, 1956  T. LE BARON ET AL  2,746,751
MEANS FOR DISPENSING MEASURED LENGTHS OF TAPE
Filed Dec. 19, 1952  3 Sheets-Sheet 1
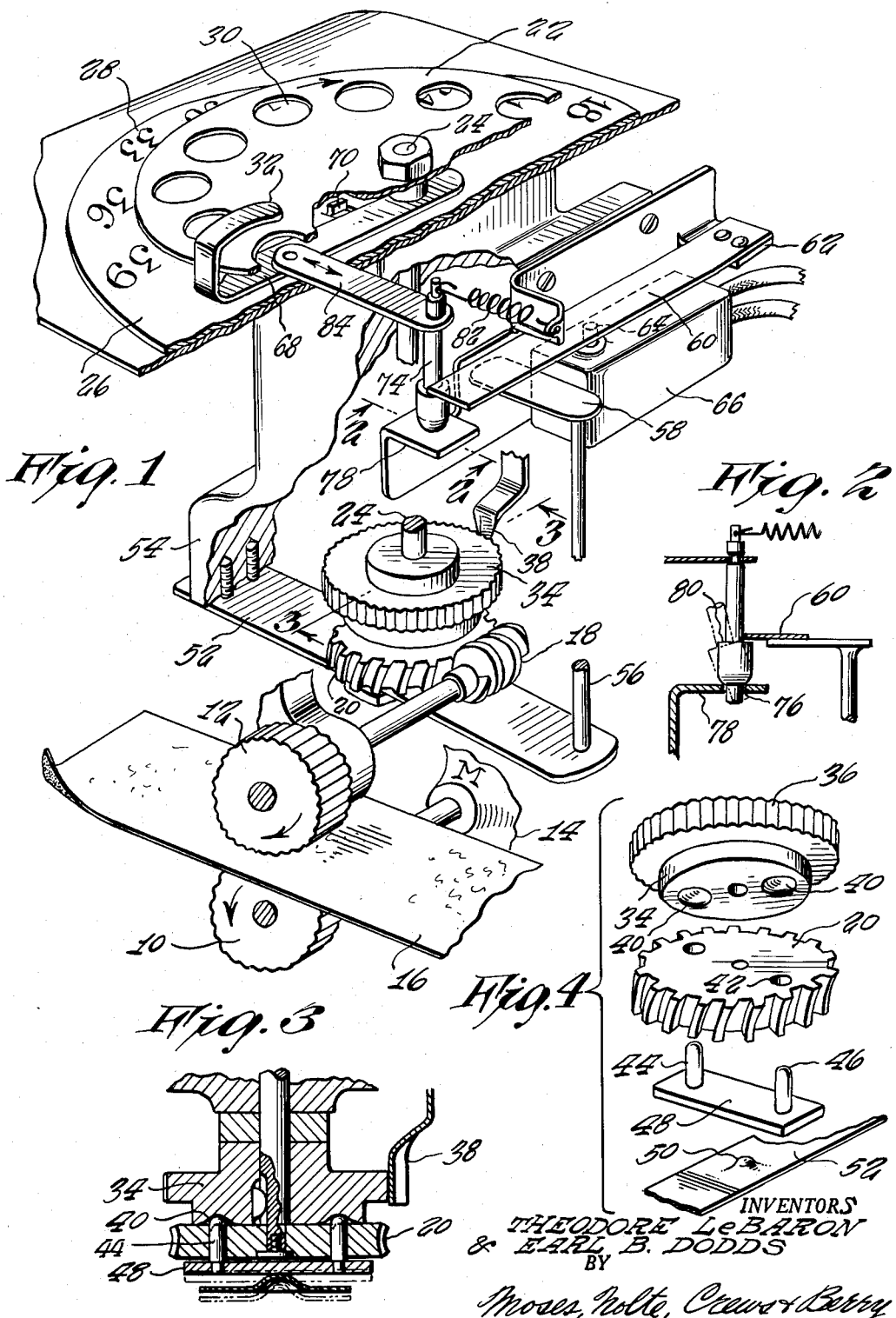
INVENTORS
THEODORE LeBARON
& EARL B. DODDS
BY
Moses, Nolte, Crews & Berry
ATTORNEYS May 22, 1956  T. LE BARON ET AL  2,746,751
MEANS FOR DISPENSING MEASURED LENGTHS OF TAPE
Filed Dec. 19, 1952  3 Sheets-Sheet 2

INVENTORS
THEODORE LeBARON
& EARL B. DODDS
BY
Moses, Nolte, Crews & Berry
ATTORNEYS May 22, 1956 T. LE BARON ET AL 2,746,751
MEANS FOR DISPENSING MEASURED LENGTHS OF TAPE
Filed Dec. 19, 1952 3 Sheets-Sheet 3
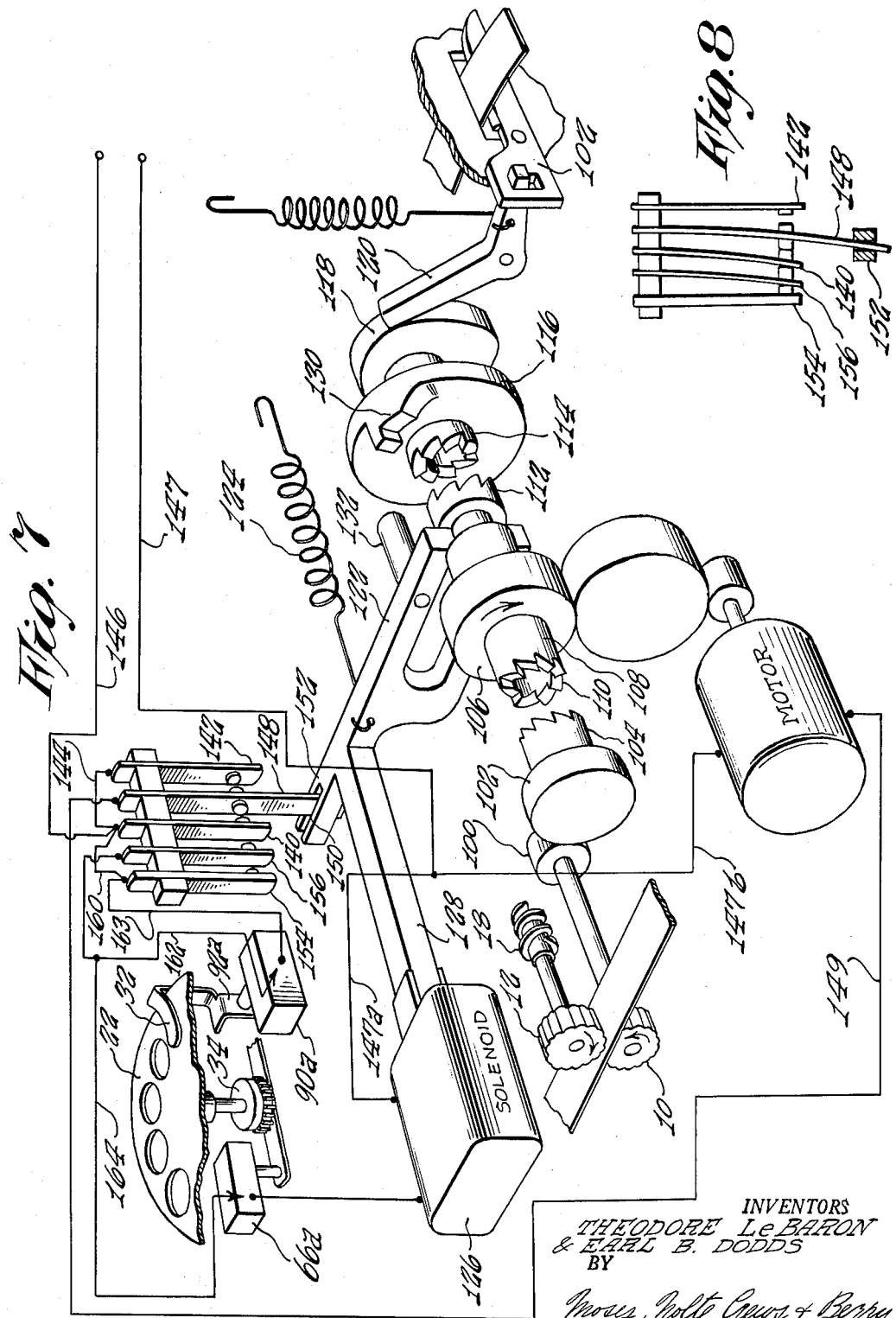
INVENTORS
THEODORE Le BARON
& EARL B. DODDS
BY
Moses, Nolte, Crews & Berry
ATTORNEYS

United States Patent Office 2,746,751
Patented May 22, 1956

2,746,751

MEANS FOR DISPENSING MEASURED LENGTHS OF TAPE

Theodore Le Baron, Oak Park, Ill., and Earl B. Dodds, Chatham Township, Morris County, N. J.

Application December 19, 1952, Serial No. 326,872

8 Claims. (Cl. 271—2.4)

This invention relates to machines or devices for dispensing strip material in measured lengths, and particularly to machines in which the dispensing is done by power means, such for instance as by an electric motor. Such machines are useful for many purposes, particularly for the dispensing of adhesive sealing tape. Such machines usually incorporate, in addition to the feeding device, means for cutting off the measured length, and in the case of machines for dispensing tape which has to be moistened, moistening means are also included.

In certain machines of the character described, the mechanism for measuring the desired length of tape embodies the use of a movable length indicator which is advanced to a position indicating the length of tape which it is desired to dispense, the advance of the indicating member also starting the tape feeding device which feeds tape until a follow-up element, operating concurrently with the feeding means, catches up with the indicator member or a device preset thereby which thereupon stops the feed. The length of tape dispensed thus depends upon the time which it takes the follow-up device to catch up with the position or setting given to the indicator mechanism.

Machines of this type have proved defective for the reason that the initial movement of the indicator member started the operation of the feed mechanism and consequently of the follow-up member before the manual movement of the indicator member could be completed, so that there is a certain overlap in which the follow-up member is advancing before the setting of the indicator member has been completed. For example, it is necessary to move the indicator member through a much longer distance when setting it for the dispensing of a long piece of tape than when setting it for the dispensing of a short piece. Also the movement of the indicator member, being accomplished manually, may take a greater or lesser period of time, depending upon the mode of procedure or aptitude of the particular operator. Sometimes an operator may initially intend to feed a short length and then decide that what is needed is a long length, causing hesitation during the operation of setting the indicator member to deliver the longer length. As a result of these variations in time of setting the indicator member, and the fact that the feed has already been initiated, the machine delivers an imperfectly measured strip.

An even more serious result of the overlapping period during which the feed may be taking place concurrently with the movement of the indicating member is that the follow-up member, which is motor driven along with the feed device, actually overtakes the manually operated indicator member while it is still being advanced, resulting in a false operation of the device. For example, each time the follow-up member overtakes the indicator member there will be a stoppage of the feed and an operation of the cutting knife, whereby a short piece of tape will be cut off. Continued movement of the indicator member will immediately restart the feed, but not from the zero position, and when the follow-up member catches up again with the indicator member another short piece of tape will be cut off. Some times several short pieces of tape will be cut off, one after another, and will accumulate adjacent to the cutting knife and completely block the operation of the machine. This may require dismantling and cleaning out the machine and prevent its use for some period of time. Even if this extreme condition does not occur, false lengths of tape will be delivered which are unusable for the intended purpose.

In accordance with the present invention, means are provided applicable to a strip serving machine of the character described which will effectually prevent the objectionable actions noted, and insure the delivery of a correctly measured strip at all times. This is accomplished by means preventing the initiation of the feed until the desired movement of setting the indicator member has been completed.

The object of the invention may be accomplished by different forms of mechanism. For example in one construction mechanical interlocking or trip mechanism is provided, whereby the power instrumentalities of the machine are not set in motion until the desired setting of the indicator member has been completed. In accordance with another form of the invention electrical means are provided for accomplishing the same result.

In the accompany drawings which illustrate certain preferred embodiments of the invention:

Figure 1 is a diagrammatic perspective view showing a mechanical interlocking mechanism embodying the invention, parts being broken away;

Figure 2 is a detail vertical section on line 2—2 of Fig. 1;

Figure 3 is a detail vertical section on line 3—3 of Fig. 1;

Figure 4 is an exploded view of the cam and gear and associated parts;

Figure 7 is a diagrammatic view showing another modified form of the invention;

Figure 8 is a diagram showing the contact blades in a different position from that shown in Figure 7.

Figure 5:
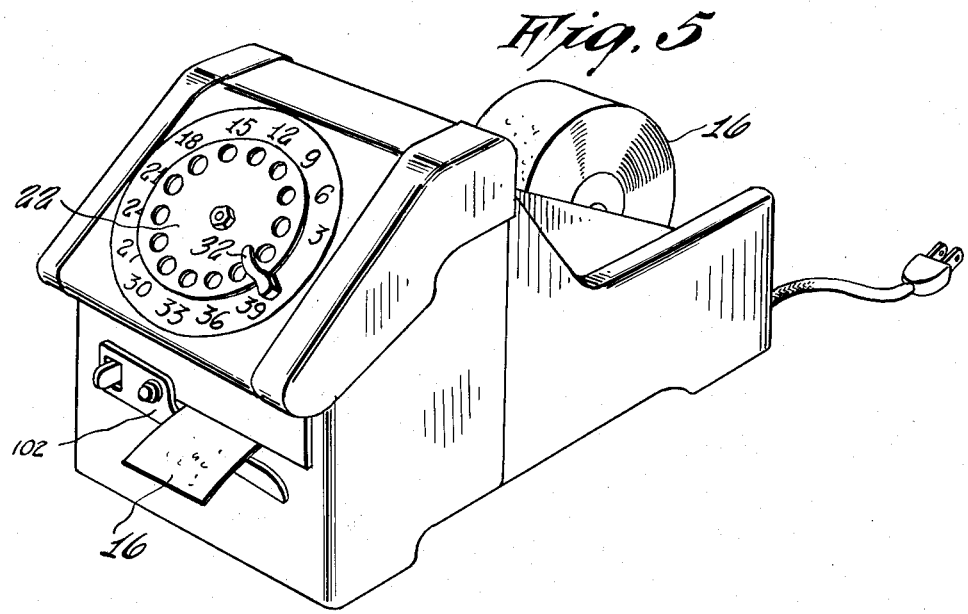
Figure 5 is a perspective view of a typical machine in connection with which the invention is used.

Referring to the drawings in detail, the invention is illustrated in connection with a dispenser in which the feeding is accomplished by means of a pair of knurled feed rollers 10 and 12, the lower one of which is shown as driven by power means indicated diagrammatically as a motor 14. The tape 16 is gripped between the rollers. The roller 12 is an idler roller which presses the tape against the driven roller 10 and also acts as a measuring roller. For this purpose it is connected with a worm 18 which meshes with a worm gear 20, constituting the driven follow-up member of the measuring or length determining instrumentalities.

The mechanism for predetermining or setting the length to be dispensed comprises a movable dial 22 mounted at the top or front of the machine on a shaft 24 and manually rotatable over a fixed plate 26, having length indicia thereon indicated at 28. The dial is shown as having a plurality of finger perforations 30, and extending over the margin of the dial is a finger stop member 32.

Mounted on the lower end of the shaft 24 is a cam disc 34 which is preferably provided with a periphery formed with shallow detent teeth 36, against which presses a detent spring 38 which holds the cam disc in any position to which it may be set by rotation of the dial 22 and shaft 24. The detent spring will permit the ready movement of the dial and cam disc, but will hold the latter temporarily in whatever position it may be set, until the next movement of the dial. The cam disc 34 has formed in its lower face a pair of cup-shaped depressions 40 (Figs. 2 and 3). A follow-up gear 20 has a pair of holes 42 therethrough, corresponding in position with the cam depressions 40. A pair of cam follower pins 44 having rounded tips 46 are mounted on a crosshead 48 and slide through the holes 42 in the gear, the rounded ends 46 of the pins entering the cam depressions 40 when the holes 42 are in registry with the depressions and being pushed down so that the tips of the pins are flush with the top face of the gear 20 when the cam disc 34 is moved to a position in which the depressions 40 are out of registry with the holes 42. The crosshead 48 bears against the boss 50 of a leaf spring 52 fixed at one end to a bracket 54 on the frame of the machine. The spring 52 is biased so as to press upwardly against the crosshead 48 thereby urging the ends of the pins into the cam depressions whenever a condition of registry exists. When the disc is moved out of registry, the pins, crosshead and spring 52 are depressed as indicated in dotted lines in Fig. 3. The free end of the spring 52 carries a push rod 56, the upper end of which bears against an arm 58 carried by a switch spring 60 mounted at one end on a fixed bracket 62 and bearing against the push button 64 of a micro switch 66. The spring 60 is biased so as to press down on the push button 64 and close the micro switch and thereby complete the circuit through the same, except when the spring 60 is pushed upward by the push rod 56 or temporarily held in the upward position by the latch means to be described.

The spring 52 is capable of exerting greater upward pressure due to its bias than the downward pressure due to the bias of the spring 60, so that whenever the cam depressions in the cam disc are in registry with the pins 44, the spring 52 will push up on the rod 56 and thereby lift the spring 60 and permit the micro switch to open, thereby breaking the circuit through such switch. The micro switch circuit is the control circuit of the machine, so that whenever the micro switch is open the feed is stopped and the tape cutter is actuated.

The parts as thus far described correspond in operation with machines at present in use. In such machines, as soon as the dial is moved, the disc 34 is rotated so as to move the cam depressions 40 out of registry with the ends of the pins, thereby depressing the pins and the spring 52. This permits the micro switch to close and the machine starts to feed tape. Simultaneously with the starting of the feed of the tape, the gear 20 starts to rotate and will continue to rotate as long as the feed continues, a condition which will obtain until the gear 20 has been driven to a point where the pins 44 again register with the cam depressions 40, whereupon the tape feed will stop, and the cutter will be actuated. The difficulty with this arrangement as heretofore used, is that the feed will start immediately upon the first movement of the dial 22, resulting in inaccuracy of length measured and in false operation of the machine as described above.

In accordance with the present invention, a safety mechanism is provided which prevents the starting of the tape feed until the desired movement of the dial has been completed. In using the dial it will be understood that the finger is placed in the chosen depression 30 and the dial is moved around until the movement of the finger is stopped by the finger stop 32. This finger stop is not mounted on a stationary part in the construction of the present invention, but is formed on the end of a lever 68 which is pivotally mounted upon the plate 26 and is capable of oscillatory movement thereon, preferably limited by means of a stop 70. A latch pin 74 is provided, the lower end of which is mounted to oscillate in a socket 76 in a bracket 78 mounted on a fixed part of the frame. The pin 74 is provided with a shoulder 80 adapted to engage under the edge of the spring 60 so that when the shoulder is under the edge of the spring the latter is held in a raised position in which the button 64 of the micro switch is in raised or "off" position and the switch is open. As long as the shoulder is in engagement with the edge of the spring in this manner, the micro switch cannot be closed. The upper end of the pin 74 is engaged by a tension spring 82 which holds the pin in a position with the shoulder under the edge of the spring. The upper end of the pin 74 is also connected by a link 84 with the lever 68 carrying the finger piece 32.

In the normal condition of the device prior to initiating the feed of a piece of tape, the gear 34 will be in such position that the pins 44 register with the depressions 40, so that the spring 52 will be free to push upwardly and lift the spring 60 into the upper position in which it will be held by engagement of the shoulder 80 on the latch pin 74. The operator now inserts his finger in the desired hole 30 in the dial and rotates the latter in a clockwise direction until the finger comes in contact with and presses against the finger stop 32. This will push down on the lever 68 and swing the latch pin 74 to the dotted line position shown in Fig. 2, thereby releasing the spring 60. The movement of the dial has already rotated the shaft 24 and the cam disc 34 so as to move the depressions 40 out of registry with the pins 44, thereby forcing the latter down and pressing down on the spring 52. The spring 52 thus no longer supports the spring 60 in its upper position and when the latch is removed from under the spring 60 the latter presses down on the micro switch button and starts the feed. It will be seen that as soon as the dial starts to move, the spring 52 is forced down, but the spring 60 is not released from its engagement with the shoulder on the latch pin until the finger of the operator has moved all the way and pressed down on the finger stop 32. Thus the feed of the tape will not start until the operator has completed the setting of the dial for the desired length. False operation of the machine is thus effectually prevented.

Figure 6:
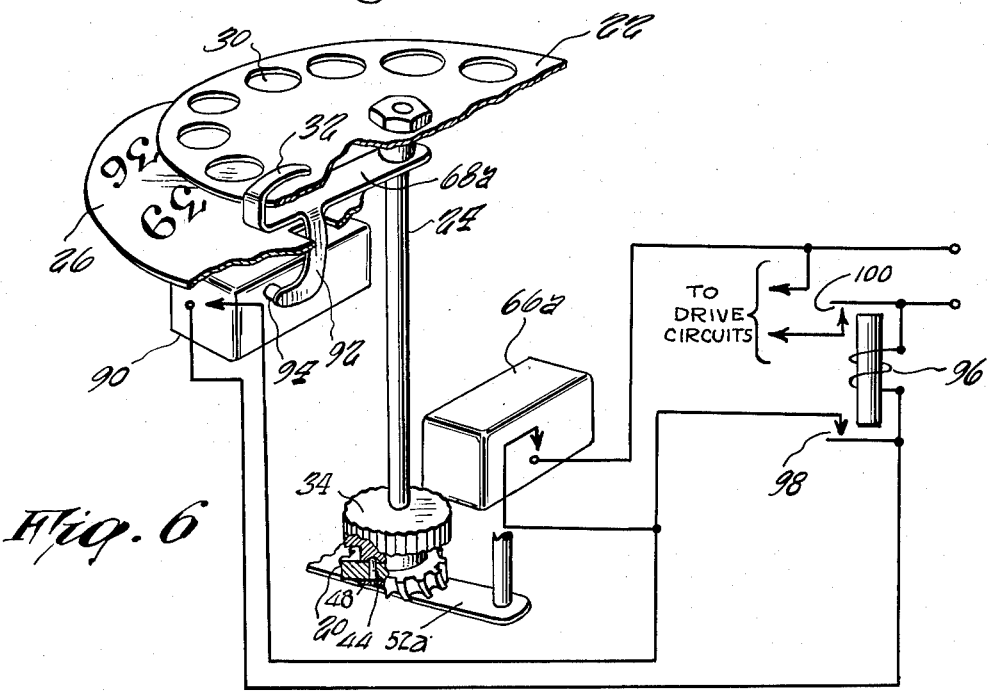
Figure 6 is a diagrammatic view partly in perspective, and partly in the form of a circuit diagram of an electrical system of a modified construction for accomplishing the objects of the present invention.

In Fig. 6 an electrical system is shown for effecting a similar operation. In this construction the dial 22, shaft 24, cam disc 34 and gear 20 are the same as already described. Mounted on the under side of the gear 20 is the cross head carrying cam pins, which are the same as the parts 48 and 44 shown in Fig. 4. The crosshead 48 presses downwardly upon the spring 52a which is biased upwardly and has a similar action to the spring 52 shown in Figs. 1 and 4, but which is arranged to directly contact with the push button of the micro switch 66a. Whenever the spring 52a is in its upwardly biased position, which occurs when ever the pins carried by the gear 20 move into the depressions in the lower face of the cam disc 34, the micro switch 66a is open and remains open, except when the disc 34 is rotated so as to move the cam depressions out of registration with the ends of the pins. In the operation of the old type of machine, as soon as the dial starts to rotate the micro switch will be closed and the tape feed started.

In the present embodiment of the invention a second switch means is provided which will prevent the closing of the drive circuit starting feed until movement of the dial has been completed. As shown, a second micro switch 90 is provided which will remain open until the finger of the operator engages the finger stop 32 which, in this instance, is mounted on a lever 68a which has a downwardly projecting arm 92 adapted to engage the button 94 of the micro switch 90 and close the switch when the pressure is applied to the finger stop 32. The closing of the micro switch 90 closes the circuit through a holding relay 96, which, when energized closes contacts 98 and 100, thereby completing the circuit through the already closed micro switch 66a and the driving means. The feed will thus take place as soon as the operator moves the dial to a point where his finger engages the finger stop 32 but not before. The drive circuit will remain closed, owing to the action of the holding relay, until the follow-up gear 20 has travelled to a position where the pins 44 are again in registry with the cam depressions, permitting the spring 52a to move up and break the circuit through the micro switch 66a, thereby stopping the feed. The breaking of the circuit through the micro switch 66a also breaks the circuit through the holding relay, provided the operator has withdrawn his finger from engagement with the finger stop 32, which he will ordinarily do as soon as he has completed a setting of the dial. The feed cannot be again started until the operator has again moved the dial to a position where his finger presses against the finger stop. It will thus be seen that this construction functions to prevent false operation of the machine in a manner similar to the mechanical trip mechanism in the form of machine shown in Figs. 1 to 4.

Figure 5 illustrates the outside of the machine, showing the measuring dial 22 and associated parts, and also showing a movable cutter 102 mounted on the front of the machine so as to cut off the projecting end of the tape 16. The cutter is preferably actuated by mechanism, not shown, to cut off the piece of tape at the instant that the circuit through the feed control is broken and the feed stopped.

The modification shown in Figs. 7 and 8 is particularly applicable to the type of machine referred to above now on the market. The general construction of this machine is shown diagrammatically, and comprises a pair of tape feeding rollers 10 and 12 such as already described, the roll 10 being driven by a gear 100 meshing with a gear 102 attached to a clutch member 104. For intermittently driving the feed rollers an intermittently running motor is provided which through suitable gearing, drives a gear 106 fixed to a slidable clutch sleeve 108 having clutch faces 110 and 112 at opposite ends thereof. The clutch face 110 engages the clutch member 104 when the sleeve 108 is moved to the left, thereby feeding tape. The tape feed is stopped without stopping the motor by moving the clutch sleeve 108 towards the right. The clutch face 112 is adapted to be engaged with a clutch face 114 when the sleeve 108 is moved to its extreme right hand position. The clutch face 114 is mounted on a cam member 116, one cam surface 118 of which is engaged by a bell crank lever 120, which operates the movable cutter blade 102. Thus when the clutch sleeve 108 is moved to its extreme right hand, the feed of the tape is stopped and the cutter is actuated to cut the stationary tape. The clutch sleeve 108 may also occupy an idle or neutral position in which neither of its clutch faces is engaged. This is the position shown in Fig. 7.

The position of the clutch sleeve is determined by means of a clutch shifter or fork 122 which is urged towards the right by a spring 124 and is moved towards the left by a solenoid 126, the plunger 128 of which is connected to the clutch shifter. When the solenoid is energized, the clutch face 110 is engaged with the clutch face 104 and tape is fed. When the circuit through the solenoid is broken the spring 124 shifts the clutch sleeve 108 to the right, thereby stopping the feed and actuating the cutter. After one revolution of the cutter cam, causing one actuation of the cutter, mechanism is provided for shifting the clutch sleeve to its neutral position, this mechanism being indicated diagrammatically as comprising a cam face 130 on the cam disc 116 which cooperates with a projection 132 on the clutch shifter to separate the clutch faces 112 and 114 after one revolution of the member 116. The machine then stops until another length of tape is required.

In the machine now on the market the length of tape to be fed is determined and the machine started by the operation of finger wheel 22, similar to that described in connection with the Figures 1 to 6. This operates a cam mechanism 34 which closes a microswitch 66a. In the present commercial machine, the closing of this switch causes the closing of the circuits through the motor and solenoid and immediately starts the feed, causing the faulty action already referred to. The controls of the present commercial machine include a switch having two blades 140 and 142 which are connected by a bridge connection 144 and to one power line 146. Oscillating between these blades is a third blade 148 which is actuated by a connection at 150 to an arm 152 mounted on the clutch shifter 122. The blade 148 is connected to the motor by a wire 149. One terminal of the microswitch 66a is connected to the solenoid 126 and the other terminal of the switch is connected with the blade 140, by a connection omitted in the present construction. The circuits are completed to the solenoid and motor from the other power line 147 through wires 147a and 147b. With this arrangement, as soon as the finger wheel 22 is moved, the circuits through the solenoid and motor are closed and the feed of the tape is started, as already described.

In accordance with the form of applicant's invention now being described additional contact blades 154 and 156 are added to the control switch and a second microswitch 90a is provided corresponding to the microswitch 90 shown in the form of invention illustrated in Fig. 6, and actuated by means of an arm 92a connected with the finger piece 32. The switch 90a remains open until the operator's finger having completed the desired measuring movement of the finger wheel 22 engages the finger piece 32. One terminal of the switch 90a is connected to the wire 164 by the wire 162 and the wire 164, in this form of the invention, is connected to the blade 156. The other terminal of the switch is connected by wire 163 to the blade 154. The closure of the switch 90a completes the circuit through the solenoid and causes the clutch shift fork 122 to move to the left. The movement of the clutch shift fork to the left moves the blade 148 to the left so as to cause contact on the latter to engage the blade 140 and force it against the blade 156 which in turn is forced against the blade 154 as shown in Fig. 8. It will be seen that the circuit is now closed from the blade 140 which is connected with the power line 146 through the blade 148 and wire 149 to the motor.

The blades 140 and 154 are connected by bridge connection 160. The operator does not need to maintain the pressure on the finger piece 32 because as soon as he removes his finger, although the microswitch 90a is opened, the movement of the solenoid has now closed a holding path around such microswitch through the bridge connection 160 and the contacts on the blades 140, 154 and 156. This keeps the solenoid energized and continues the feed of tape until this holding path is broken by the worm driven cam previously described which opens the switch 66a when the desired length of tape has been fed. At this point in the cycle the clutch shifter 122 moves to the right, stopping the feed and actuating the cutter, as previously described. At the same time the movement of the blade 148 away from the blade 140 separates the contacts between the blades 140, 154 and 156.

From the above it may be seen that the two functions of the control mechanism of selecting the length of tape to be fed and starting the feed have been separated, this being true of all forms of the present invention described, thus eliminating the malfunctioning of the machine to which the present commercial machine is subject.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

What we claim is:

1. In a machine for dispensing measured lengths of strip material, power driven strip feeding means, a presettable length indicator, a follow-up element driven concurrently with the feed means for stopping the feed when the follow-up element has reached the position determined by the setting of the presettable indicator, operative connections from said power driven strip feeding means for driving said follow-up element, starting means for the power driven strip feeding means and follow-up element, two control devices for said starting means actuation of both of which is necessary to start the feed, one of said control devices being actuated by the initial movement of setting the presettable indicator and the second of which is actuated only upon completion of the setting movement of said presettable indicator.

2. In a machine for dispensing measured lengths of strip material, power driven strip feeding means, a presettable length indicator, a follow-up element driven concurrently with the feed means for stopping the feed when the follow-up element has reached the position determined by the setting of the presettable indicator, operative connections from said power driven strip feeding means for driving said follow-up element, said power driven strip feeding means including a control circuit and a switch therein, spring means operatively associated with said switch for actuating said switch, means actuated by the initial movement of said presettable indicator for setting said spring means in condition to actuate said switch, latch means for preventing actuation of said switch until completion of the setting movement of the indicator and means for releasing the latch upon completion of the setting movement of the indicator.

3. A machine as claimed in claim 2 in which the presettable indicator is a dial having finger engaging formations thereon, and the means for releasing said latch means includes a movable finger stop adapted to be engaged by the finger of the operator upon completion of the setting movement of the dial.

4. In a machine for dispensing measured lengths of strip material, power driven strip feeding means, a presettable length indicator, a follow-up element driven concurrently with the feed means for stopping the feed when the follow-up element has reached the position determined by the setting of the presettable indicator, operative connections from said power driven strip feeding means for driving said follow-up element, said power driven strip feeding means including a control circuit and a switch therein, spring means operatively associated with said switch for actuating said switch including two springs acting in opposition to one another, one of said springs constructed and arranged when released to close the switch, and the second spring being stronger than said first spring and acting when released to hold said first spring in inoperative position, means to move the second spring to inoperative position in response to movement of the presettable indicator to release the first spring, latch means associated with the indicator for holding said first spring in inoperative position except when the indicator has been moved to the completion of its setting and means for releasing the latch upon completion of the setting movement of the indicator.

5. In a machine for dispensing measured lengths of strip material, power driven strip feeding means, a presettable length indicator in the form of a dial having finger engaging formations thereon, a cam operatively connected with the dial, a follow-up element driven concurrently with the feed means having a cam follower cooperating with the cam, a control switch for the strip feeding means, a spring biased in a direction to close said control switch, a second spring stronger than said first spring biased in opposition thereto and constructed and arranged to prevent said first spring from closing said control switch, an operative connection between said cam follower and said second spring holding said spring in inoperative position when the cam has been displaced by movement of the dial, a latch for holding said first spring in a position in which the control switch is open, and a movable finger stop associated with said dial for tripping said latch when the operator has moved the dial to a position in which the operator's finger engages said finger stop.

6. In a machine for dispensing measured lengths of strip material, power driven strip feeding means, a presettable length indicator, a follow-up element driven concurrently with the feed means for stopping the feed when the follow-up element has reached the position determined by the setting of the presettable indicator, a control circuit for said strip feeding means, two switches in said control circuit both of which must be closed to complete the circuit, switch closing means for the first switch operable upon the initiation of the setting movement of said presettable indicator, and switch closing means for the second switch operable upon completion of the setting movement of said presettable indicator.

7. A machine as claimed in claim 6 in which a holding relay circuit is provided for maintaining said second switch closed until the first switch is opened.

8. In a machine for dispensing measured lengths of strip material in which mechanism for feeding the tape is provided including a tape feeding roll, an electric motor, a clutch for connecting said motor to drive said roll, said clutch including a movable member and a solenoid for shifting the same, a circut for supplying current to the motor and solenoid a presettable length indicator in the form of a dial having finger engaging formations thereon, a cam operatively connected with the dial, a follow-up element driven concurrently with the feed means having a cam follower cooperating with the cam, a first switch in the motor and solenoid circuit, and an operative connection between said cam follower and said switch, the improvement which consists in providing a second switch, a movable finger stop associated with said dial for closing said second switch when the operator's finger has moved the dial to its limit position in which the operator's finger engages said finger stop, said second switch being connected with the motor and solenoid circuit so that when said first and second switches are both closed, the solenoid is energized so as to move the clutch shift fork to a position engaging the clutch with the feed roll, a plurality of switch contacts, certain of said contacts being arranged to close a holding circuit around said second switch, a connection for actuating the same from the clutch shift lever and connections between said switch contacts such that when the clutch shift lever is shifted to clutch engaging position the holding circuit is established around said second switch, whereby said second switch may be allowed to open while the feed of the tape continues.

References Cited in the file of this patent

UNITED STATES PATENTS

| | | |
|---|---|---|
| 1,732,635 | Chabot | Oct. 22, 1929 |
| 2,258,912 | Steen et al. | Oct. 14, 1941 |
| 2,298,492 | Longfield | Oct. 13, 1942 |
| 2,339,194 | Reichelt | Jan. 11, 1944 |
| 2,655,372 | Hempel | Oct. 13, 1953 |